US006962542B2

(12) United States Patent
Van Spijk

(10) Patent No.: US 6,962,542 B2
(45) Date of Patent: Nov. 8, 2005

(54) CONTINUOUSLY VARIABLE TRANSMISSION AND PULLEY

(75) Inventor: Johannes Gerardus Ludovicus Maria Van Spijk, Drunen (NL)

(73) Assignee: Van Doorne's Transmissie B.V., AM Tilburg (NL)

(*) Notice: Subject to any disclaimer, the term of this patent is extended or adjusted under 35 U.S.C. 154(b) by 221 days.

(21) Appl. No.: 10/173,109

(22) Filed: Jun. 18, 2002

(65) Prior Publication Data

US 2003/0109340 A1 Jun. 12, 2003

(30) Foreign Application Priority Data

Jun. 18, 2001 (EP) .......................................... 01202334

(51) Int. Cl.[7] .............................................. F16H 9/00
(52) U.S. Cl. ........................................ 474/18; 474/28
(58) Field of Search .............................. 474/8, 18, 28, 474/11, 25, 70, 46; 477/45–46, 48–49

(56) References Cited

U.S. PATENT DOCUMENTS 4,713,041 A * 12/1987 Stockton ..................... 474/28
5,182,968 A * 2/1993 Mott .......................... 474/11
5,221,235 A * 6/1993 Ogawa ........................ 474/25
5,334,108 A * 8/1994 Lamers ......................... 474/8
5,427,578 A * 6/1995 Iijima .......................... 474/18
5,628,700 A * 5/1997 Yamada et al. ............... 474/18
5,676,612 A * 10/1997 Schellekens et al. .......... 474/28
5,776,022 A * 7/1998 Schellekens ................. 474/18
6,089,999 A 7/2000 Imaida et al.
6,174,253 B1 * 1/2001 Walter et al. ................. 474/28

FOREIGN PATENT DOCUMENTS

EP 0 321 921 A1 6/1989
EP 0 560 427 A1 9/1993

* cited by examiner

*Primary Examiner*—Marcus Charles
(74) *Attorney, Agent, or Firm*—Young & Thompson

(57) ABSTRACT

A transmission includes a set of pulleys, in which at least one disc is axially displaceable and provided with cylinder piston elements. The cylinder/piston elements include at least one pressure chamber with radial walls and concentric cylinder walls and at least one of the radial walls of the pressure chamber is secured to one of the concentric cylinder walls by an immovable fit. The wall near to the fit is produced with a resiliently hingeable feature, in which the hinging feature is realized with the inclusion of an axially extending sleeve like foot part, integral to the wall, and with both axial faces thereof extending uninterrupted smoothly up to the lower end part of the wall.

18 Claims, 2 Drawing Sheets

CONTINUOUSLY VARIABLE TRANSMISSION AND PULLEY

BACKGROUND OF THE INVENTION

Figure 1:
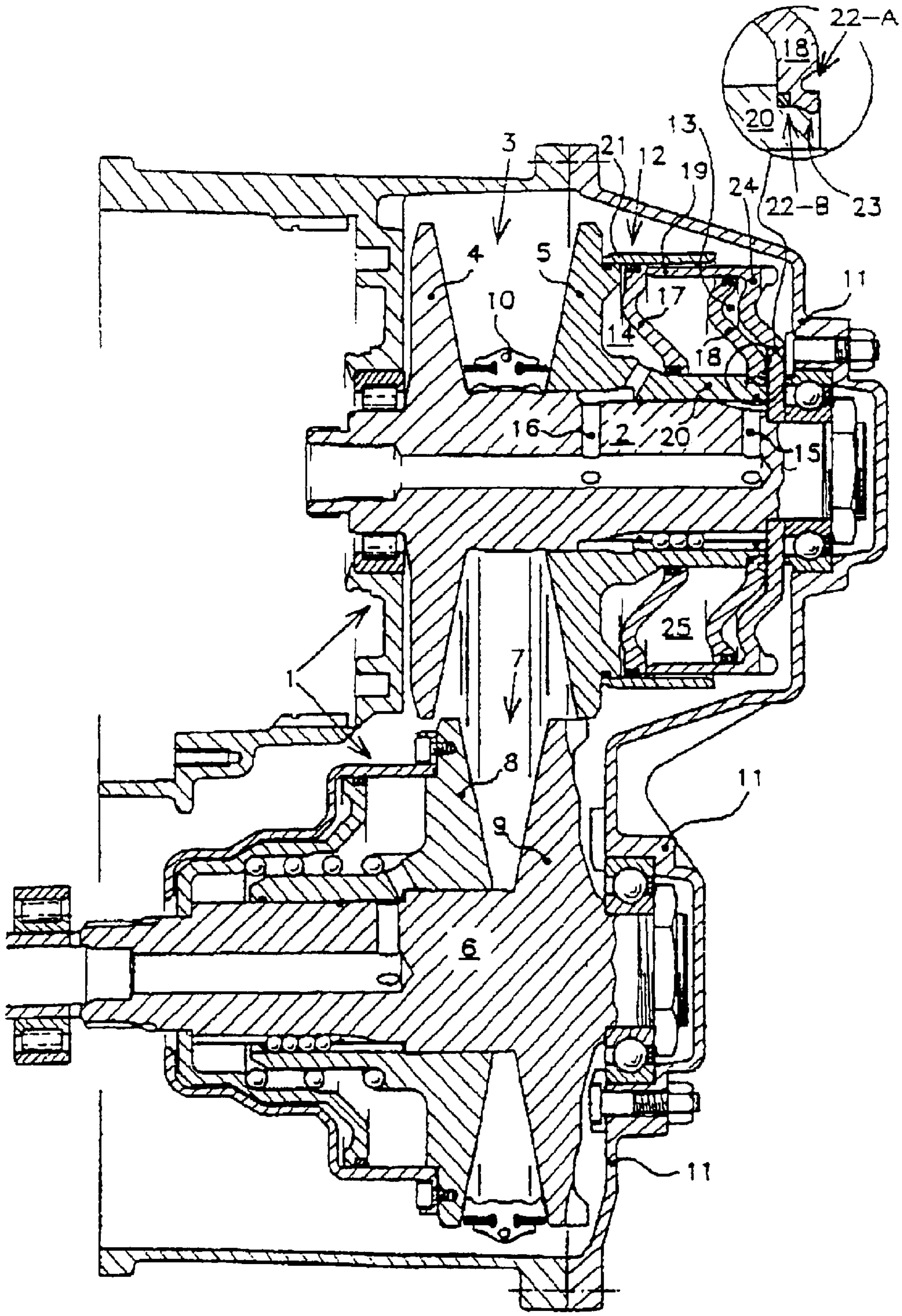

The invention relates to a continuously variable transmission, in particular a pulley design therefor.

DESCRIPTION OF THE RELATED ART

Transmissions and pulleys of such kind are generally known and used. One such transmission and pulley is disclosed in EP-A-0 560 427, which is considered an improvement over U.S. Pat. No. 3,948,111. The pulley of the latter document comprises a separate seal element or piston incorporating a resilient hinge between two concentric cylinder walls that are part of a pressure chamber. Such seal element and such hinging feature are of vital importance for the functioning of a pulley, and therewith of the entire transmission.

Pressure chambers, usually hydraulic, are incorporated for urging a pulley disc in axial direction so as to effect adequate clamping for and a radial shifting of a belt or other transmission element located between the two discs a pulley. Particularly when a relatively high torque is transmitted by the latter known pulley, problems may arise regarding the degree of stability of the pulley, and deformations can be observed which may affect the action of the transmission. It was the object of the invention according to EP-A-0 560 427 to provide an improved pulley, in particular a piston therefor, suitable for relatively high powers and whose stability and resistance to permanent deformation were improved.

To this end, the pulley according to EP-A-0 560 427 was characterised the presence of a resilient hinge in the wall material of the pressure chamber of the cylinder/piston means, with the result that, under the influence of any momentary relatively high pressure, the relevant wall can locally absorb forces in an elastic manner, in particular if the transmission transmits a high torque. The resilient hinge is in the known construction realised by a locally thinner section of the wall, in particular by a local recess therein. The absorption of the forces in this prior art construction is effected at a predetermined, known position of the resilient hinge, and in a predictable manner. In this proposition, the forces are absorbed locally by elastic deformation and by controlled expansion of the wall around the resilient hinge. Because the forces are to a large extent absorbed in an elastic manner by the wall with the resilient hinge, they are passed on to the supporting part, for example the supporting shaft on which the displaceable disc is mounted, in very much reduced form, as a result of which, under heavy load, clamping and deformation of the relevant part, in particular the sleeve of the moving sheave, forming a shaft, is prevented The stability and the resistance to permanent deformation, as well as the action of the transmission are therefore greatly improved.

In the known embodiment, the fixed connection is designed as a force fit, which has the advantage that, on the one hand, a fixed connection is achieved by combining the force fit and the closely adjacent resilient hinge, while, on the other hand, a certain degree of elastic deformation is possible without this resulting in permanent deformation.

Although the prior art construction performs satisfactorily it appears to be susceptible for further improvement, in particular for even higher forces in the pressure chamber as is consistent with nowadays tendency in transmission design. For instance, where the known design performed very well up to nominal chamber pressures up to 15 bar, it appeared to suffer from damage at nominal chamber pressures around 25 bar. Test results showed that the press fit of the wall on to the shaft lost its existence and the supporting face of the shaft was hammered by forceful contact with the wall as a result of rapidly changing pressure levels during operation, while leakage occurred.

SUMMARY OF THE INVENTION

It is thus an object of the present invention to provide a construction suitable for lastingly sustaining very high forces in the pressure chamber, at least less prone to the effects occurring with high pressures in the known construction, while still maintaining the favourable feature of hinging. In accordance with the invention such is realised with a principal design change in accordance with the features defined.

With the provision of a sleeve like foot part to the radial inner side of the wall and with uninterrupted smoothly formed wall faces, a hinge section is created in the piston, defined by the transition from wall to foot part. The construction with the foot part has for advantages that at the radial inner end portion of the axial outer side of the wall a relatively large section is available for taking up tensile stresses, thus creating a lower risk of exceeding the yield stress of the wall material and therewith lasting deformation. Simultaneously, it is realised that the axial end of the foot part away from radial extending wall is loaded by such resulting forces in a favourable manner, so that the press fit of the wall, in particular this foot part, has a high chance of being maintained during life time of the construction. Another advantage is that in principle no, at least significantly less hammering of the axial supporting face of the shaft will take place by the wall under changes in pressure load, since the hinging movement of the wall is displaced towards the region of the transition and only the foot part is in contact with the shaft. The latter is in the present construction in particular of significance, since the supporting face in this design functions as a positioning element for the wall at assembly and during operation. Such design is alternatively denoted positive connection of the wall and obviates the necessity of an additional recess in the shaft for staking the wall, thereby reducing manufacturing cost. In conformance herewith, in a preferred embodiment, of the present construction, securing the wall position by staking of the foot part on to the shaft part is omitted.

Figure 2:
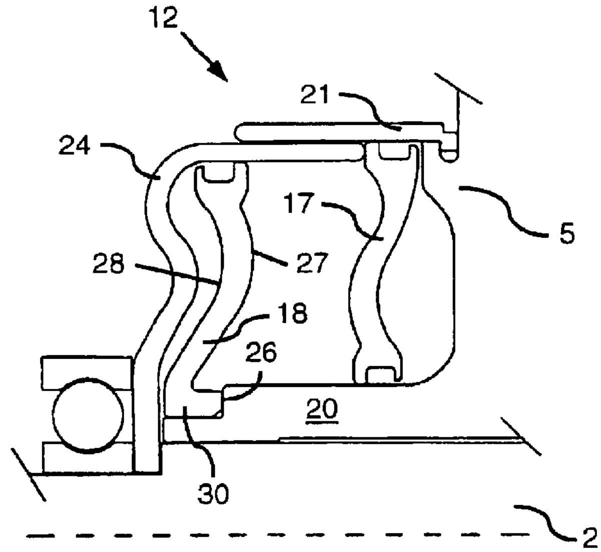
Figure 3:
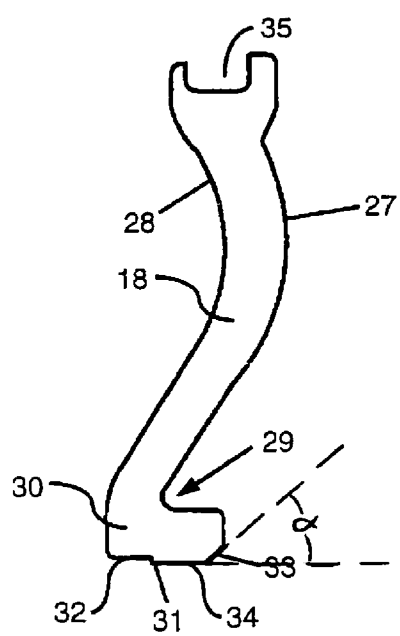

The invention will be explained in more detail, together with its further advantages, by way of example, with reference to the following drawing, in which identical reference numbers refer to corresponding construction parts, and in which:

FIG. 1 shows a diagrammatic illustration of a known continuously variable transmission having a pulley of the type according to the invention, and in which a circled prior art detail of the transmission has been taken out and enlarged;

FIG. 2 schematically represents the principle design according to the invention and manner in which it is incorporated in the transmission;

FIG. 3 is a detailed representation of a first embodiment of the piston design according to the invention.

Throughout the present description, reference to an axially outward direction shall mean directed away from the disc 5. Correspondingly, reference to radial outward direction shall mean directed away from the central axis of the relevant part.

FIG. 1 diagrammatically shows a continuously variable transmission 1, which is illustrated in part. The transmission 1 comprises a primary shaft 2, on which a primary pulley 3 is fitted in the form of discs 4 and 5, disc 5 being axially displaceable along the shaft 2 in a manner still to be specified. The transmission 1 furthermore comprises a secondary shaft 6, on which a secondary pulley 7 is fitted with discs 8 and 9, disc 8 of which may be displaced along the shaft 6. An endless drive belt, chain or belt 10 has been fitted around the pulleys 3 and 7, the path of the belt 10 between the sets of discs 4, 5; 8, 9 being variable and dependent on the axial position of the displaceable discs 5 and 8.

The primary shaft 2 is connected in a manner known per se to an engine (not shown) and the secondary shaft 6 is connected to the wheels of a vehicle (not shown)

Inside the partly illustrated housing 11 are fitted, in particular the, generally two, movable discs 5 and 8, and, in the remainder of this description, the disc 5 will be explained in more detail. The axially displaceable disc 5 comprises cylinder/piston means 12 which generally comprise at least one pressure chamber 14 In the embodiment shown, the transmission 1 comprises cylinder/piston means which comprise a further, second pressure chamber 13. However, it is possible that, under certain circumstances, as desired, providing the means 12 with a single pressure chamber is sufficient. The chamber 25 is unpressurised. A medium under pressure is supplied to and discharged from, in this case, both the chambers 13 and 14 through suitable passages 15 and 16, in order thereby to affect the axial position of disc 5. The pressure chamber 13 comprises essentially radially directed walls 18 and 24, in addition to cylindrical wall 19 and shaft 2. Wall 17 is displaceable between wall or hub 20 and cylinder wall 21 of the disc 5. In addition, wall 17 rests against the wall 19, while one end of wall 18 seals displaceable on cylindrical wall 19 and, in this embodiment, is connected by its other, circled end to hub 20 of the disc 5. Wall 18 is also referred to as the piston 18 of a cylinder piston means.

The enlarged detail shows that, at the position of the point where the walls 18 and 20 are connected to one another, there is in the prior art construction a resilient hinge 22 which in this prior art design has the form of a recess 22A outside the wall and a recess 22B at the inner diameter and inner side of the wall. Thus, wall 18 can deform flexibly. In the enlarged detail, items 18 and 20 are represented in a position at some distance from wall 24.

In the prior art and presently preferred embodiment, the connection between the items 18 and 20 at the side closest to the construction 22A, 22B is effected by means of a force fit. The force fit is preferably of such elastic design that the narrow clearance of hub or wall 20 is maintained and wall 20 remains displaceable relative to the shaft 2.

FIG. 2, by part of a transmission section and mirrored relative to figure 1, shows the piston 18 according to the invention incorporated in a pulley, specifically the primary pulley. The wall 18 according to the invention has a foot part 30, which abuts a supporting face in the form of radial wall part 26 of a shaft, specifically embodied the sleeve or hub 20 of disc 5. It shows the inner face or side 27 and the outer face 28 of the wall 18 to be smoothly extending as seen in cross section, i.e. without interrupting recesses like recesses 22A and 22B of the prior art design.

FIG. 3 in detail represents the piston according to the invention, with a curvedly shaped transition, or hinging section 29 between the inner wall side 27 and the foot part 30. To effect a localised hinging at the location of the transition of the wall 18 and the foot part 30, it is suggested to locally adopt the smallest width of the wall as measured perpendicular to a radially and tangentially extending centre plane of the wall and/or by providing the inner wall side 27 at the location of the hinging transition section 29 with a relatively small radius of curvature. Here such curvature of the hinging transition section 29 has a radius of about 0.8 mm, which is within a preferred range from 0.7 mm to 1.25 mm. Preferably the foot part 30 has a length of more than one and a half times, the thickness occurring over the largest portion of the wall 18. More preferably the foot part 30 should extend axially as long as possible, e.g. over the entire axial length of the axial stroke of the neighbouring wall 17, i.e. virtually over the entire axial length of the pressure chamber 14. Thus the foot part 30 would then bear wall 17. A radially inner end of the foot part 30 has a recess 32 of small radial extension starting at an axial point 31. Point 31 is preferably located to the left of the hinging transition section 29 as depicted in FIGS. 2 and 3, i.e. axially outward therefrom. By this provision it is secured that a press fit section 34 of the foot part of the piston 18 is located to axially towards the disc 5 to the right of point 31 in FIG. 3, i.e. axially inward. Any deformations occurring under pressure loads in the environment of the hinging transition section 29, in particular a pressure in the cylinder space between cylinder 24 and piston 18, which cause a tilting tendency of the foot part 30, whereby the foot 30 is radially lifted slightly at the location of recess 32 with respect to section 34, result in a tightening of the press fit, rather than a relieving thereof that could occur when such fit would be also realised at the axial location of the recess 32. In other words, the recess 32 further aids in determining the localisation of the hinging section of the wall 18, 24, i.e. in a section away from the section where in accordance with an aim of the invention, a stable and unaffected force fit of the wall is achieved, i.e. in the area at the radial inner part of the foot part 30, where the foot 30 is force fitted to the shaft 20.

The thickness of the foot 30 is slightly smaller than the radial height of the wall 26, thus minimising the effect of any residual hammering, on the wall 26 which might e.g. occur when the axial length of the foot part 30 is kept to a minimum and when the materials applied are qualitatively not of the most expensive kind. The effect includes the risk of material particles coming loose in the relevant pressure chamber, which might severely hamper if not damage the functioning of the piston/cylinder assembly, and therewith of the transmission. Particularly in the case the invention is applied at the wall 24, such smaller height also has a function in allowing the largest possible stroke of e.g. sleeve 20, i.e. allowing an overlap thereof with the foot part 30, without there being any chance of mutual contact therewith at the abutting face.

The foot part 30 may further be provided with a wall part 33 preferably extending under an angle $\alpha$ between 25 and 40 degrees with the press fit section 34 forming a small recess therein in the general square shape of the foot part 30 and promoting optimal press fitting by allowing for a possible transition edge in the shaft 2. In this embodiment, a radial innermost curvature on the outer wall side 28 transits to a lowest portion of the same side 28, extending straight and square relative to the foot part 30, at a radial location above the foot part 30, preferably at a distance less than the thickness of the wall 18. The piston may favourably be produced by sheet metal forming processes.

The invention apart from the contents of the following claims also relates to the preceding description and all details and aspects in the drawing which may not be described but which are directly and unambiguously derivable therefrom by a man skilled in the art.

What is claimed is:

1. A pulley comprising:

a set of discs adapted to be fitted on a shaft of a transmission, at least one disc being axially displaceable and provided with cylinder/piston means, said cylinder/piston means comprising at least one pressure chamber with radial walls and concentric cylinder walls, at least one of said radial walls secured to one of said concentric cylinder walls by an immovable fit i) radially either to a sleeve part of a disc or to a part of said shaft and ii) axially to a shoulder part of said sleeve part or of said shaft, said at least one radial wall comprising, near said fit, a resilient hinge connecting to a lower portion of a radially extending wall part, the radially extending wall part having outer and inner axial wall faces extending uninterruptedly smoothly up to a radially inner diameter, wherein the resilient hinge comprises i) a foot part, axially protruding relative to the lower portion and integral therewith, and ii) a transition section providing a smooth curve between the inner axial wall face of the radially extending wall part and the axially extending foot part, wherein, the foot part at the radial inner, and axially outer side is provided with a recess, of which the radial extension starts at a location axially outwardly beyond the transition as seen from the axial wall face towards the other axial wall face.

2. The pulley according to claim 1, wherein the foot part extends axially from the radially extending wall part towards a pulley disc.

3. The pulley according to claim 1, wherein the thickness of the foot part in a radial direction substantially conforms to a nominal thickness of the radially extending wall part of the wall in an axial direction.

4. The pulley according to claim 1, wherein the axial length of the foot part, measured at a radial inner side, is more than one and a half times a nominal thickness of the radially extending wall part of the wall in the axial direction.

5. The pulley according to claim 1, wherein an end face of the foot part directed axially inward directed from the radially extending wall part towards a pulley disc fittingly abuts to a supporting face or shoulder part in the form of a radially outward extending wall part of the shaft of the sleeve.

6. The pulley according to claim 5, wherein the radial height of the foot part is less than the radial height of the supporting face of the shaft of the sleeve.

7. The pulley according to claim 1, wherein the transition section is produced in a rounding with a radius of curvature equal to or larger than 0.5 mm, but less than 1.5 mm.

8. The pulley according to claim 1, wherein the radially extending wall part of the wall, in radial outward direction from the foot part thereof, over a substantial part of its radial height is inclined towards the axially displaceable disc of the pulley and, also over a substantial part of its radial height, away from the said disc, whereby said wall part at the latter substantial part thereof does not extend away from the disc beyond the transition section.

9. The pulley according to claim 8, wherein the foot part axially extends up to a point within the axial extension of a radial outer recess in the wall for taking up a sealing ring, and ends in an axial direction up to a point within the axial extension of said axial wall surface.

10. The pulley according to claim 1, wherein the inner axial wall surface of the wall in radial inward direction continues to be curved up to beyond the level of the radial outer circumference of the foot part.

11. The pulley according to claim 1, wherein the outer circumference of a shaft of said sleeve at the location where the wall is fitted is substantially uniform in diameter over the length of the foot part.

12. A pulley, comprising:

a set of discs adapted to be fitted on a shaft of a transmission, at least one disc being axially displaceable and provided with cylinder/piston means, said cylinder/piston means comprising at least one pressure chamber with radial walls and concentric cylinder walls, at least one of said radial walls secured to one of said concentric cylinder walls by an immovable fit i) radially either to a sleeve part of a disc or to a part of said shaft and ii) axially to a shoulder part of said sleeve part or of said shaft, said at least one radial wall comprising, near said fit, a resilient hinge connecting to a lower portion of a radially extending wall part, the radially extending wall part having outer and inner axial wall faces extending uninterruptedly smoothly up to a radially inner diameter, wherein the resilient hinge comprises i) a foot part, axially protruding relative to the lower portion and integral therewith, and ii) a transition section providing a smooth curve between the inner axial wall face of the radially extending wall part and the axially extending foot part, wherein, a part of the radially extending wall part of the wall, at least near the transition from the radially extending wall part to said foot part is produced in an axial thickness smaller than a nominal thickness of the radially extending wall part of the wall in an axial direction, and larger than three quarters of said nominal axial thickness.

13. The pulley according to claim 12, wherein the smaller axial thickness is realized by the smoothly shaped axial wall face and the other axial wall face of the wall slightly converging to each other.

14. The pulley according to claim 12, wherein a smallest axial thickness of the wall is realized at the transition section and is provided smoothly curved.

15. A pulley, comprising:

a set of discs adapted to be fitted on a shaft of a transmission, at least one disc being axially displaceable and provided with cylinder/piston means, said cylinder/piston means comprising at least one pressure chamber with radial walls and concentric cylinder walls, at least one of said radial walls secured to one of said concentric cylinder walls by an immovable fit i) radially either to a sleeve part of a disc or to a part of said shaft and ii) axially to a shoulder part of said sleeve part or of said shaft, said at least one radial wall comprising, near said fit, a resilient hinge connecting to a lower portion of a radially extending wall part, the radially extending wall part having outer and inner axial wall faces extending uninterruptedly smoothly up to a radially inner diameter, wherein the resilient hinge comprises i) a foot part, axially protruding relative to the lower portion and integral therewith, and ii) a transition section providing a smooth curve between the inner axial wall face of the radially extending wall part and the axially extending foot part, wherein, the radially inner side of the foot part at an axial end thereof that is directed towards the axially displaceable disc is recessed over a radial distance of about 1 mm, such that the resulting recess is defined by a wall part extending partly in radial direction under an angle of up to 40 degrees with general axial direction of the foot part.

16. A pulley comprising:

a set of discs adapted to be fitted on a shaft of a transmission, at least one disc being an axially displaceable disc; and a cylinder/piston means acting on the axially displaceable disc, said cylinder/piston means comprising a pressure chamber with first and second radially directed walls (18, 17) pressing against concentric cylinder walls (24, 20, 21), the first radially directed wall (18) being a piston with a first, radially outward end sealed displaceable on one of the concentric walls and with a second, radially inward end connected to a hub of the displaceable disc, the piston comprising an axially extending foot part (30) connected to the hub, a radially extending wall part (18) having outer (28) and inner (27) axial wall faces extending uninterruptedly smoothly up to the first end, and a curvedly shaped transition hinging section (29) intermediate the inner axial wall face and the axially extending foot part, the outer and inner axial wall faces and the transition hinging section being free of any recesses, wherein, the foot part further comprises, opposite the transition hinging section, a recess (32) with a radial extension starting at an axial point (31) and extending to the outer axial wall face (28), the radially inward end connects to the hub of the displaceable disc with a base of the foot part press fit against the hub and a vertical wall part of the foot part adjacent a vertical wall part (26) of the hub, a height of the vertical wall part of the foot part being less than a height of the vertical wall part of the hub.

17. The pulley of claim 16, wherein, a radius of curvature of the transition hinging section is within a range from 0.7 mm to 1.25 mm, and the foot part has a length of more than one and a half times a thickness occurring at a largest portion of the radially extending wall part so that the foot part can be positioned to bear the second wall (17).

18. The pulley of claim 16, wherein, the foot part further comprises a slanted wall part (33), extending between the base of the foot part and the vertical wall part of the foot part, the slanted wall part extending at an angle between 25 and 40 degrees with the base of the foot part.

* * * * *